INVENTOR.
LANE DUNCAN
BY Hyde and Meyer
ATTORNEYS.

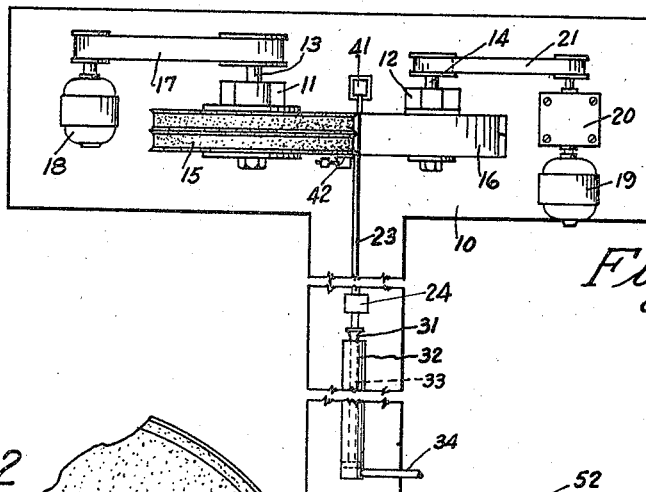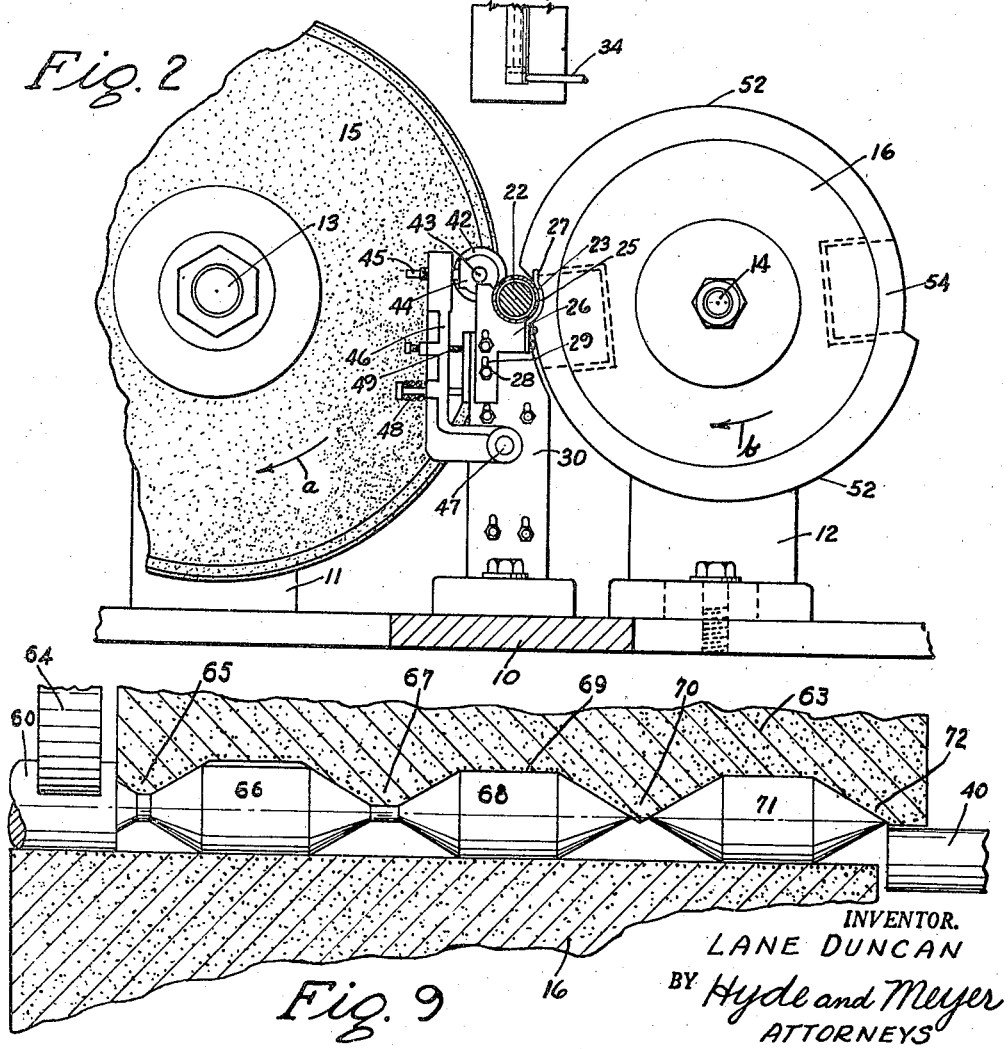

Patented Feb. 17, 1948

2,436,252

UNITED STATES PATENT OFFICE 2,436,252

GRINDING APPARATUS AND PROCESS

Lane Duncan, Los Angeles, Calif.

Application January 18, 1946, Serial No. 641,990

5 Claims. (Cl. 51—103)

This invention relates to process and apparatus for forming small pins, such as pivot shafts for clock balance wheels, dowel pins for fine instrument housings, or other like pins, by a grinding operation.

One object of the invention is to provide improved process and apparatus by which such small pins are formed progressively, by several operations performed in sequence, from a stock bar, with periodic step movement along a path parallel to the face of a grinding wheel which not only finishes the external diameter of the body of the pin, but also accurately forms both ends thereof, finally severing the pin from the bar in finished form.

Another object is to provide improved method and apparatus by which such pins are formed by a grinding operation without any necessity of chucking the work, reliance being had entirely upon the forming and cross feeding devices for accurate centering.

Still another object is to provide improved grinding apparatus for the purpose described, characterized by the provision of automatic means for feeding, supporting and rotating a stock bar during its step by step movement along the working face of a grinding wheel or wheels which in two or more steps, perform the operations of preliminary grinding or roughing down, finishing, and cutting off the finished piece.

Another object is to improve the work supporting, centering, feeding and stop devices, in such manner as to permit fine and accurate adjustment of all parts, but nevertheless insuring extreme accuracy in the form, shape and dimensions of the finished product.

Finally, another object is to generally improve the mechanism in such manner as to make all its operations automatic, requiring no attention by the operator, except to insert the stock bar and start the machine, and which mechanism has an unusually high rate of production and efficiently turns out a product of high quality.

Further objects of the invention in part are obvious and in part will appear more in detail hereinafter.

In the drawings,

Fig. 1 is a plan view, illustrating one form of machine suitable for practice of the invention;

Fig. 2 is a front elevation, on a larger scale, the work and the tube through which it is fed being shown in section;

Fig. 9 is a view corresponding to Fig. 5 and illustrating another arrangement embodying the invention.

In Figs. 2 to 9, inclusive, the size of the work has been somewhat exaggerated with respect to its actual cross sectional size, for clearness of illustration.

While the present machine is adapted for the manufacture of any article which can be made from small diameter cylindrical bar or wire stock by appropriate reduction by grinding of the shape and diameter of its shank or body and end portions, for convenience and in no sense of limitation it has been illustrated in a form adapted for the manufacture of very small pivot pins or shafts, such as are used for the balance wheels of clocks, or the rotating parts of delicate instruments, such as electric meters and the like.

Figure 4:
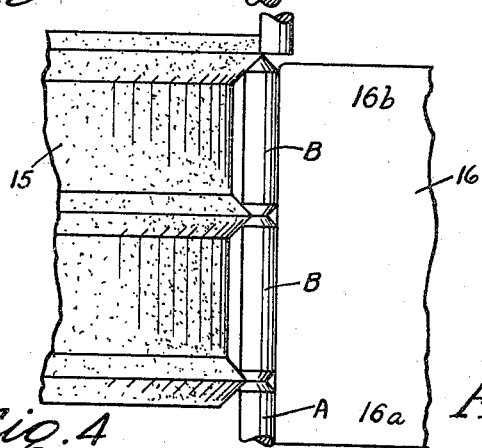
Fig. 4 is a similar view, at an intermediate stage of the grinding operation.

Referring to Fig. 4, the present machine is designed to produce, from a stock bar A, one by one, a series of pivot pins B, each having a cylindrical body or shank and two opposite conical or pointed ends, as shown. These pins are relatively small, being of the order of ¼ inch long, with the diameter of the shank of the order of .020 to .040 inch or so. Thus the machine must work to very close dimensions and limits of tolerance, and in addition must support and hold the work in such manner that the finished product in cross section is truly circular about a definite axis.

The present machine may be assumed to operate upon a cylindrical stock rod made of hard steel wire and having a diameter of .040 inch and being from three to five feet or more in length, with the finished pin about ¼ inch long.

The machine illustrated comprises a base, shown conventionally at 10, on which are mounted supports 11, 12 in which are journalled the shafts 13, 14 of a grinding wheel 15 and a work feeding or regulating wheel 16, the former being about 20 inches and the latter about 14 inches in diameter. One support, as 12, may be adjustable in any suitable manner toward and from the other for accurately placing the two wheels with reference to each other in their first set up and from time to time as wear occurs. Both wheels are rotatable. The grinding wheel is turned in the direction of arrow $a$ Fig. 2, at about 1200 R. P. M. or 6000 feet per minute peripheral speed, by belt drive at 17 from motor 18, while regulating wheel 16 is rotated, in the direction of arrow $b$ Fig. 2 at about 12 to 22 R. P. M by drive from motor 19 through the speed reduction mechanism shown conventionally at 20 and belt drive 21. Wheel 15 is a hard wheel made of any suitable fine grained abrasive material, such as "Carborundum," while wheel 16 is somewhat softer, being made of like abrasive bonded with rubber, its purpose being to rotate the work and feed it laterally against the wheel 15, which performs the grinding operation.

The work, a piece of hard steel wire or rod A, three to five feet long, is fed to the operating zone through, and is supported by, a metal tube, 23, of small internal diameter, say 1/8 inches, to reduce whip of the rod when rotating. This tube, at its outer end, is mounted in a fixed support shown conventionally at 24, and at its inner end is removably mounted in a seat 25 between a supporting block 26 and a spring leaf 27, the block being adjustable, as by release of the clamping bolts 28, which pass through elongated slots 29 into a post 30 adjustable on the bed in any suitable manner.

When one stock bar is used up the forward end of the tube can be pulled up out of its seat, a new rod is pushed into the tube from the front end, and the tube is replaced in its seat, with the machine ready for another sequence of operations.

The stock bar is advanced or fed through the tube by any yielding light force, such as a spring, although the drawings conventionally show a pusher 31 attached to the rod 32 of a fluid pressure piston which is advanced in its cylinder 33 by light air pressure supplied through pipe 34.

Figure 3:
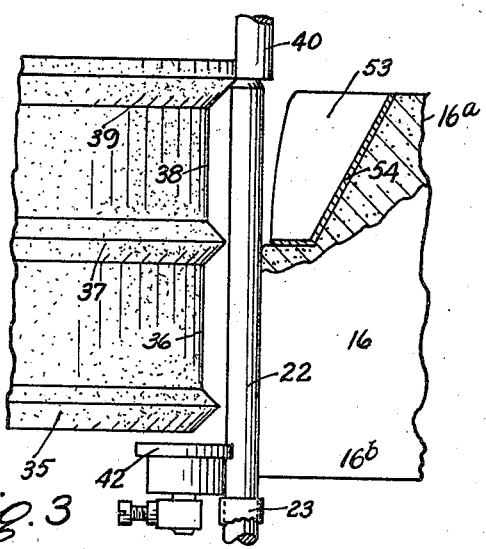
Fig. 3 is a detail plan view, showing the working parts beginning an operation on a fresh stock rod.
Figure 6:
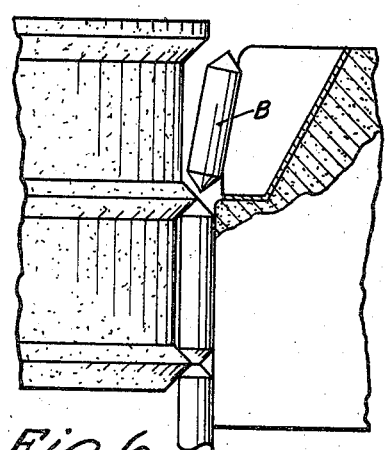
Fig. 6 is a similar view, showing release or discharge of the finished piece.

Referring to Figs. 1 and 3, grinding wheel 15 has its peripheral working face provided with a V-shaped peripherally extending roughing rib 35, a cylindrical surface 36, a V-shaped finishing and cut off rib 37, a cylindrical finishing surface 38, and a half V-rib 39 for finishing the terminal point of the piece being finished. As will appear, the end portion of the stock rod which lies between the regulating and grinding wheels, is advanced bodily to the left, in Fig. 3, while rotating, against the grinding wheel, until the terminal pin B is fully finished and is cut off. During this operation rib 35 partially roughs out an annular groove in the rod, while surface 38 finishes the grinding of the shank, and ribs 37 and 39 the grinding of the ends and cutting off of the terminal pin, but at no time does surface 36 usually perform any grinding operation, since its diameter is purposely made less than that of surface 38. Surface 36, however, might be made to carry some part of the load, by slightly increasing its diameter to make it do a little rough grinding on the shank. The roughing rib 35, of course, is not quite so high as the ribs 37, 39, so that it has not reached the central axis when a finished pin is cut off.

Figure 5:
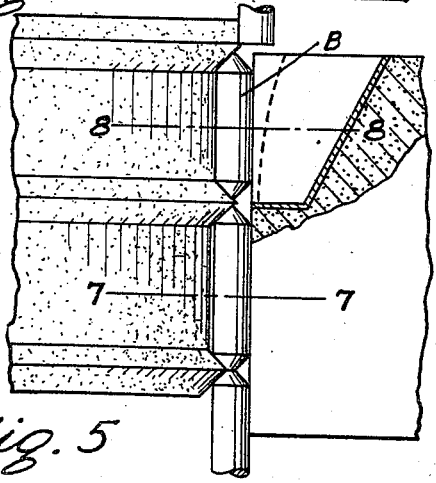
Fig. 5 is a similar view, showing completion of the operation.
Figure 8:
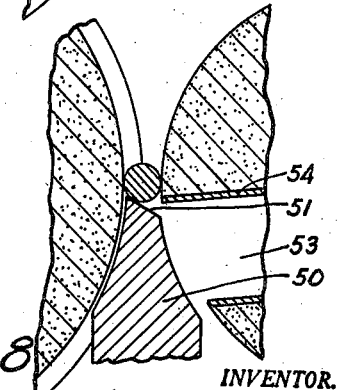
Fig. 8 is a similar section on the line 8—8, Fig. 5.

The stock bar, after every cut off operation, is advanced until its free end abuts a stop 40, adjustable endwise in a fixed support 41, as is usual, and having a transverse flat end surface against which the end of the stock bar impinges. This surface is so located that the extreme end of the piece being finished moves laterally off from the face of the stop as the grinding operation is concluded, enabling the extended angular working face of rib 39 to extend beyond the point of the pin and take a light cut off from the conical pin end and finish its point at the same time that severance is completed by rib 37, as shown in Fig. 5.

In advance of the working zone, and closely neighboring the grinding wheel 15, and opposite a portion of wheel 16, I mount a metal roller 42 freely rotatable on a shaft 43 carried by a block 44 having a stem 45 adjustable and clamped in an arm 46 pivoted at 47 on the same support 30 which supports tube 23. Said arm is yieldingly sensitive to a compression spring 48 which tends to move the arm clockwise in Fig. 2, its motion in that direction being limited by adjustable stop 49. This stop is adjusted to such position that when the arm 46 is fully advanced, the peripheral surface of the roller 42, which engages the work, is outwardly beyond all grinding surfaces of wheel 15. Consequently, when the regulating wheel engages the work, at the beginning of a grinding operation, the work is gripped between wheel 16 and roller 42, so that it begins to rotate before it is pressed against the grinding wheel.

Figure 7:
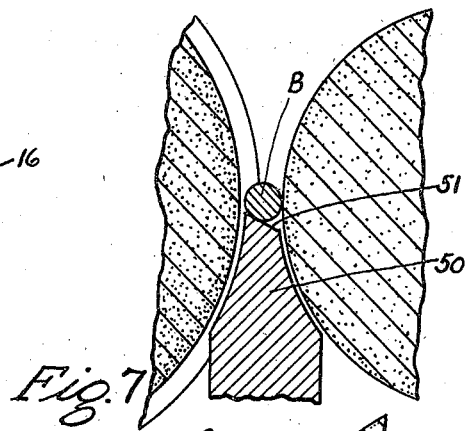
Fig. 7 is a detail sectional elevation on the line 7—7, Fig. 5.

Support 30 also carries a work support, marked generally 50, Fig. 7, which is a wedge shaped metal piece lying between the wheels 15, 16 and extending clear across the face of both wheels beneath the work. Its upper edge or surface 51, of course, is very narrow, only a few thousandths of an inch wide, so that it is difficult to show in the drawings, except by exaggeration, but said surface slants downwardly to the right, in Fig. 7, at an angle of about 30°. The purpose of this slant is to cause the stock bar to ride up the incline as it moves toward the grinding wheel and has its diameter reduced thereby, thus maintaining the central axis of the work in the same horizontal plane during the entire grinding operation.

Since the clearance between wheels 16 and 15 is so slight, it is usual, in the original set up of any machine, to use the wheels 15, 16 themselves for finishing the shaping of the work support 50. This support, roughly of the proper shape, but with its upper surface sloped off as described, is set in the machine at the proper level and then the machine is started, causing wheels 15, 16 to come together and grind off the side faces of the work support to the proper shape to provide sufficient clearance.

Coming now to regulating wheel 16, this wheel is of such form and is so arranged that its relatively slow rotation, 12 to 22 R. P. M., both rotates the work and bodily feeds it, transversely to its axis, toward and into the grinding wheel, while the latter performs its grinding operation. The face of wheel 16 is divided into two zones, 16a, 16b, the former opposite grinding surface 36, and the latter opposite surface 38. In zone 16a the face of the wheel is straight across, as viewed in Fig. 3, it having no peripheral ribs or depressions. But, circumferentially, it is of cam form, having any suitable number of lobes 52, two being shown, the surfaces of which are of gradually increasing radius counterclockwise of the wheel in Fig. 2.

The working face of the wheel in zone 16b is of similar cam contour, but each of its cam surfaces terminates at a pocket or recess 53 formed in any suitable manner, as by embedding or setting a metal cup 54 in the body of the wheel, as shown.

The operation is as follows:

Let us assume that a fresh piece of stock has been inserted in the tube 23 and that said tube has been restored to its position in its seat. All other parts have been adjusted and set up to the proper positions, and wheel 15 is properly shaped, according to the specifications for the finished product. The lowest part of one of the cam lobes 52, opposite a pocket 53, is opposite the stock, and the two motors are operating or are started. The distance between the high points of the ribs 35, 37, 39 and wheel 16 is greater than the stock diameter, so that it advances freely, under the push of its fluid pressure feed, until its end engages stop 40. Roller 42 has advanced to its extreme right-hand position Fig. 2, engaging the side of the stock bar. The stock bar is supported from beneath by the inclined surface of work support 50.

As wheel 16 turns relatively slowly, it presses the stock bar against the roller 42, and causes it to rotate counterclockwise in Fig. 2. The gradually increasing radius of the cam lobe of wheel 16 gradually moves the stock, in the operating zone, horizontally and to the left in Fig. 2, applying it to the grinding wheel, whose several ribs and surfaces, by their rapid rotation, (1200 R. P. M.), grind down the stock bar in the manner shown in Figs. 4 and 5 until, finally, just before the next pocket of wheel 16 reaches the operating zone, the rib 37 cuts through the stock axis. The parts are usually so formed and adjusted that this rib moves, for example, .005 inch beyond the central axis, as shown in Fig. 5. In this final position, also, rib 39 also extends beyond the axis of the final piece and finishes the pointed end thereof. Now, when the next pocket reaches the operating zone the finished terminal piece drops into the pocket, as in Fig. 6, which carries it around over the top of the wheel and discharges it on the far side of the wheel, if it does not drop out sooner.

Immediately, the stock bar, now released from side feed by a cam lobe 52, and freed from obstruction ahead of it, automatically advances one more step until it abuts the stop. Roller 42 again advances. Thereupon all operations are repeated, as before.

When a new bar is inserted, of course, the complete forming and finishing of the ends and shank of the first pin is performed by the ribs 37, 39 and surface 38. But after that, each pin is first roughed out, in a preliminary step, by ribs 35 and 37, and possibly slightly by surface 36, as explained, and is finished by ribs 37 and 39 and surface 38.

In any case the operation is progressive, each pin being formed by a plurality of grinding operation, performed in sequence, the stock advancing one step each time, until finally the finished piece is ejected into a pocket, from which it later drops when the pocket reaches emptying position.

Fig. 9, in more or less diagram form, illustrates another arrangement for forming pins, of slightly modified proportions, by a three-stage operation. Here the stock bar 60 is fed endwise, step by step, as before, against the stop 40, and at each stage is subjected to the operating effect of the regulating wheel 16 which rotates it and feeds it laterally against the working face of grinding wheel 63. 64 illustrates the yielding idle roller, corresponding to roller 42.

In this arrangement the rib 65 of the grinding wheel produces a rough grinding effect on the ends of two pins, only partially forming the cone of the pin remaining on the stock. In this stage the shank of pin 66 is untouched.

Rib 67 produces further reduction and roughing of the pointed ends of pins 66 and 68, while the surface 69 of the wheel rough grinds its shank. Rib 70 of the wheel rough grinds the advance end of pin 68, finishes the trailing end of pin 71, and passes beyond the central axis so as to perform the cut off operation. The inclined surface of rib 72 finishes the advance end of the finished pin 71.

In both forms described, the grinding wheel surfaces which take the final cut from the terminal pin being finished, are very carefully and accurately dressed, and the parts are so proportioned, shaped and adjusted that this finish cut, in the final stage, on both the shank and ends of the pin, is very slight, only a few (two or three) ten thousandths of an inch. Therefore, since the duty of the final finishing grinding surfaces is so slight, the grinding wheel can be maintained in operation for a long period, many hours, without redressing.

Further, since both the grinding and regulating wheels are mounted upon fixed axes, and are not advanced toward each other by the movement of slides or other parts, no question of lost motion of operating parts arises, and upon each adjustment and setting up of the parts extremely accurate production is possible over a long period of time. It is unnecessary, in other words, to adjust slides or otherwise to take account of lost motion from time to time, as when resetting the machine after redressing of a wheel or wheels.

One important advantage of the invention is the reduction in cost of the finished product by reason of the possibility of working upon hardened steel stock. Heretofore, in the art, in producing these very small pins, it has been customary to do so by turning down a soft steel stock with cutting tools to the proper shape and size, then hardening the finished pins, in quantity, by a heat treating operation, and then finishing the hardened pins by a grinding operation. Much of the cost of such operations is eliminated by using wire stock already hardened and requiring no subsequent heat treatment, and by employing grinding wheels capable of reducing such stock, where turning tools are unsuitable for the purpose, because of the great difficulty of rotating such small stock fast enough to produce the necessary peripheral cutting speed.

The machine also eliminates any necessity of special mechanism for individually feeding blank articles to the working tools, as when blanks are cut off from a bar and are then handled individually.

The machine shown, with two lobes on wheel 16, and rotating the wheel at, say, 15 R. P. M., produces 30 pins per minute or 1800 per hour. All pieces are truly cylindrical with accurately shaped ends and of high quality. Indeed, in each piece the two conical ends and cylindrical shank are all truly concentric with reference to each other, with no tolerance or allowance whatever. No attendance is required except to insert the stock and start the machine. Consequently the product is produced at low cost.

Other advantages of the invention will be apparent to those skilled in the art.

What I claim is:

1. The method of forming small diameter hardened steel pins of the character described, comprising rotating a bar of stock upon its axis, advancing the stock periodically by uniform steps, and between advance movements thereof applying grinding ribs laterally to the stock at spaced points to first preliminarily rough the pin ends and partially sever the stock by grinding at one point between successive pins and in the same grinding operation form the body and complete the severance of an earlier pin.

2. The method of forming small diameter hardened steel pins having cylindrical shanks and conical ends from a bar of stock, consisting in rotating said bar upon its axis and periodically advancing it step by step, and between successive advance movements of the bar, feeding said bar laterally against a rotating grinding wheel having a forming surface adapted to shape the pin body and V ribs which successively are of increasing height and adapted in one position of the bar to rough out the pin ends and in its next position to finish said ends and complete severance of a finished pin.

3. Apparatus for grinding pins, comprising a grinding wheel mounted to rotate rapidly on a fixed axis and having its working face provided with a cylindrical pin shank forming surface and with spaced circumferentially extending pin end roughing and finishing and cut-off ribs, means for supporting a stock bar in a position parallel with said axis and with its advance end portion opposite said face, a fixed stop against which the end of the stock bar abuts when it is advanced longitudinally to working position, and a work regulating wheel rotatable on an axis parallel to said fixed axis and having an operating cam face lying opposite the working face of the grinding wheel and engaging the stock bar for rotating the latter and feeding it to the grinding wheel transversely to said axis, whereby at the advance end of the stock bar during each operation one pin is finished and cut off and a second pin is rough ground.

4. Apparatus for grinding pins, comprising a grinding wheel mounted to rotate rapidly on a fixed axis and having its working face provided with a cylindrical pin shank forming surface and with spaced circumferentially extending pin end roughing and finishing and cut-off ribs, means for supporting a stock bar in a position parallel with said axis and opposite said face, a fixed stop against which the end of the stock bar abuts when it is advanced longitudinally to working position, a work regulating wheel rotatable on an axis parallel to said fixed axis and having an operating cam face lying opposite the working face of the grinding wheel and engaging the stock bar for rotating the latter and feeding it to the grinding wheel transversely to said axis, and yielding means adapted to engage the bar in opposition to said regulating wheel to thereby initiate rotation of the bar prior to its engagement with the grinding wheel, whereby at the advance end of the stock bar during each operation one pin is finished and cut off and a second pin is rough ground.

5. Apparatus for grinding pins, comprising a grinding wheel mounted to rotate rapidly on a fixed axis and having its working face provided with a cylindrical pin shank forming surface and with spaced circumferentially extending pin end roughing and finishing and cut-off ribs, means for supporting a stock bar in a position parallel with said axis and with its advance end portion opposite said face, a work regulating wheel rotatable on an axis parallel to said fixed axis and having an operating cam face lying opposite the working face of the grinding wheel and engaging the stock bar for rotating the latter and feeding it to the grinding wheel transversely to said axis, a freely rotatable friction roller mounted to rotate on an axis parallel to said fixed axis and on the same side of the stock bar with the grinding wheel and having its peripheral surface normally extending beyond the working surface of the grinding wheel, and yielding means biasing said roller toward and into engagement with the stock bar, to thereby initiate rotation of the stock bar by the regulating wheel prior to its engagement with the grinding wheel.

LANE DUNCAN.

REFERENCES CITED

The following references are of record in the file of this patent:

UNITED STATES PATENTS

| Number | Name | Date |
|---|---|---|
| 344,777 | Griswold | June 29, 1886 |
| 1,757,612 | Binns et al. | May 6, 1930 |
| 1,850,054 | Strickland et al. | Mar. 15, 1932 |
| 2,032,901 | Angell | Mar. 3, 1936 |
| 2,091,655 | Scrivener | Aug. 31, 1937 |
| 2,386,623 | Mason | Oct. 9, 1945 |

FOREIGN PATENTS

| Number | Country | Date |
|---|---|---|
| 311,931 | Great Britain | May 23, 1929 |